United States Patent
Neo et al.

(10) Patent No.: US 9,151,878 B2
(45) Date of Patent: Oct. 6, 2015

(54) APPARATUS AND METHOD FOR MOLDING OPTICAL LENSE DURING A PUDDLE DISPENSING PROCESS

(71) Applicant: OmniVision Technologies, Inc., Santa Clara, CA (US)

(72) Inventors: Huiyan Neo, Sunnyvale, CA (US); Regis Sh-Louen Fan, Shanghai (CN); Chia-Yang Chang, Cupertino, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 73 days.

(21) Appl. No.: 14/028,076

(22) Filed: Sep. 16, 2013

(65) Prior Publication Data
US 2015/0077856 A1   Mar. 19, 2015

(51) Int. Cl.
| | |
|---|---|
| G02B 27/10 | (2006.01) |
| G02B 3/00 | (2006.01) |
| B29C 33/42 | (2006.01) |
| B29C 39/02 | (2006.01) |
| B29D 11/00 | (2006.01) |
| B29L 11/00 | (2006.01) |

(52) U.S. Cl.
CPC .............. *G02B 3/0037* (2013.01); *B29C 33/42* (2013.01); *B29C 39/026* (2013.01); *B29D 11/0048* (2013.01); *B29D 11/00298* (2013.01); *G02B 3/0031* (2013.01); *B29L 2011/0016* (2013.01)

(58) Field of Classification Search
USPC .................................................. 359/619–625
See application file for complete search history.

(56) References Cited

U.S. PATENT DOCUMENTS

| | | | | |
|---|---|---|---|---|
| 2010/0177408 | A1* | 7/2010 | Lake et al. ..................... | 359/819 |
| 2014/0347748 | A1* | 11/2014 | Duparre ........................ | 359/723 |

* cited by examiner

*Primary Examiner* — Mohammed Hasan
(74) *Attorney, Agent, or Firm* — Lathrop & Gage LLP (57) ABSTRACT

An optical mold including a spacer cavity portion, a lens cavity portion and a flow stop control portion for allowing optical lens material to flow between the spacer cavity portion and the lens cavity portion and an optical lens array formed therefrom. The optical mold may further include a pedestal located within the spacer cavity portion for supporting the mold during a puddle dispensing process. A method for using the optical mold including the spacer cavity portion, the lens cavity portion, and the flow cavity portion, and optionally the pedestal.

24 Claims, 10 Drawing Sheets

APPARATUS AND METHOD FOR MOLDING OPTICAL LENSE DURING A PUDDLE DISPENSING PROCESS

BACKGROUND

Design of wafer level optical lenses using a puddle dispensing process utilizes a mold to stamp down, or imprint, a puddle of optical lens material on a substrate thereby creating a lens within cavities of the mold. Prior technology utilizing the puddle dispensing process often creates air bubbles that cannot escape cavities within the mold. Such air bubbles are undesirable and greatly affect the quality of the lens design.

Furthermore, an edge of the mold associated with the maximum lens aperture typically has to press against the substrate such that the puddle of optical lens material can sufficiently disperse within the cavity defining the lens. However, many optical lenses are damaged during the imprinting process because the mold is in direct contact with the substrate.

To remedy the aforementioned problem, molds may not be imprinted the entire way to the substrate such that a base layer is formed between the substrate and mold edges. However, the base layer is typically of an undesired thickness. Furthermore, additional and unnecessary optical lens material is required to create the base layer, thereby increasing cost of manufacture.

SUMMARY OF THE EMBODIMENTS

The below is a description of exemplary embodiments of the invention. The below description is intended to provide a summary of certain aspects of the invention and is not intended to be limiting in scope. For example, certain embodiments may have more or fewer elements than described below.

In a first aspect, described herein is an apparatus for molding an optical lens during wafer level puddle dispensing process is described, the apparatus including a mold having a spacer cavity portion with a first top, a lens cavity portion with a second top, a flow stop control portion, with a third top, defining a channel located between the spacer cavity and the lens cavity portion, wherein the spacer cavity portion, the lens cavity portion and the flow stop control portion are aligned along a first horizontal plane such that optical lens material to flow between the lens cavity portion and spacer cavity portion through the flow stop control portion. The apparatus and/or mold may further include a pedestal within the spacer cavity portion. The pedestal may be one or more of a single cylindrical pedestal, a plurality of cylindrical pedestals and/or a bar-shaped pedestal.

In a second aspect, described herein is a method of manufacturing an optical lens array, the method including forming a spacer portion of the optical lens array, forming a lens portion of the optical lens array, forming a flow stop control portion of the optical lens array, the flow stop control portion defining a cavity between the lens portion and the space oration, wherein the steps of forming a spacer portion, forming a lens portion and forming a flow stop control portion are completed concurrently by imprinting an optical lens mold on a substrate having optical lens material disposed thereon.

In a third aspect, described herein is an exemplary optical lens array formed during a puddle dispensing process, the optical lens array including a plurality of optical lens portions; a spacer portion; and a flow stop control portion located between the spacer portion and the plurality of optical lens portions. The optical lens array may further include a pedestal cavity portion.

DETAILED DESCRIPTION OF THE EMBODIMENTS

Reference is now made to the figures wherein like parts are referred to by like numerals throughout. Referring generally to the figures, the following discussion describes an optics mold for a wafer level puddle dispensing process including a pedestal, and methods of manufacturing an optic element array using the same.

Figure 1:
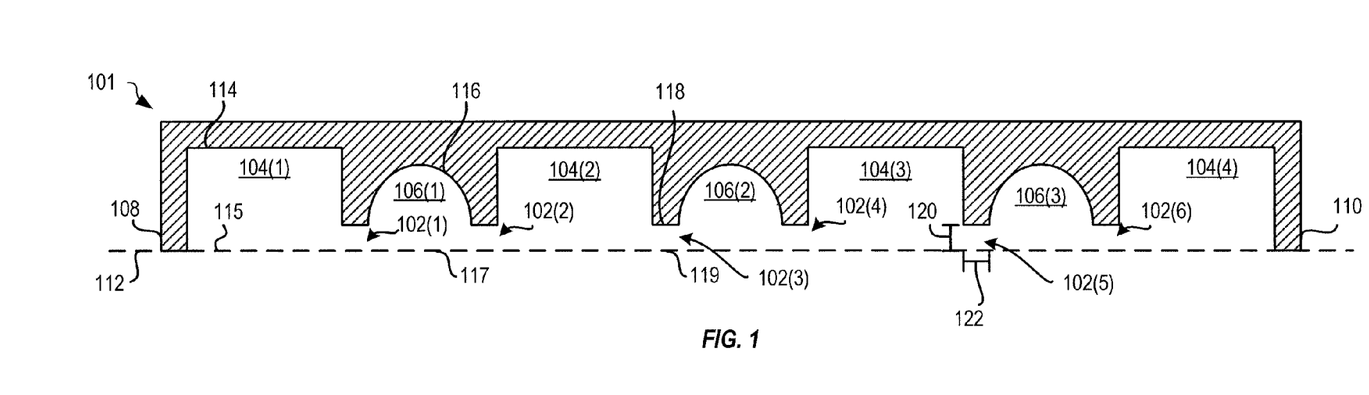
FIG. 1 depicts an exemplary mold apparatus including a flow stop control portion for molding optical lenses during a puddle dispensing process, in one embodiment.

FIG. 1 depicts an exemplary mold 101 for molding optical lenses during a puddle dispensing process including a flow stop control portion 102, in one embodiment. Mold 101 includes spacer cavity portions 104(1)-104(4), lens cavity portions 106(1)-106(3) and the flow stop control portions 102(1)-102(6). Mold 101 is illustrated having "closed" ends 108 and 110. Ends 108 and 110 are closed because the bottom of the mold 101 may touch the top of substrate, indicated by dashed line 112, during the imprinting process. It will be appreciated that mold 101 may include more or fewer spacer portions, lens cavity portions, and flow stop control portions without departing from the scope hereof. It is further appreciated that respective ones of spacer cavities may be of different sizes and shapes without departing from the scope hereof. Similarly, respective ones of lens cavity portions and flow stop control portions may be of different sizes and shapes without departing from the scope hereof. However, for clarity of illustration, spacer cavity portions, lens cavity portions, and flow stop control portions are shown having the same size and shapes.

Spacer cavity portions 104 provide a space in which optical lens material can accumulate during the imprinting process. Without spacer cavity portions, air bubbles can more easily from within lens cavity portions 106. Spacer cavity portions 104 are defined by a first top 114 and a first thickness 115. First thickness 115 being the distance from the first top 114 to an edge of the optical lens material during puddle dispensing. For example, the first thickness 115 may be the distance from the first top 114 to substrate 112. First thickness 115 may alternatively be the distance from first top 114 to the top of a base layer of optical material on top of substrate 112. Optical lens material may be for example an acrylic or epoxy based material.

Lens cavity portions 106 define the physical shape of one or more optical lenses formed using mold 101. Lens cavity portions 106 may have a second top 116 and a second thickness 117. Second top 116 may be defined by the boundary of mold 101 at the location of each respective lens cavity portion 106. Second thickness 117 may vary within each lens cavity portion 106 to define the shape of a lens formed within the lens cavity portion. Lens cavity portion 106 may be aligned with spacer cavity portion along a first horizontal plane (e.g. defined by top of substrate 112 or a base layer of optical lens material located thereon).

Flow stop control portions 102 enable the optical lens material to flow between spacer cavity portions 106 and lens cavity portions 104 during the imprinting process. Flow stop control portions 102 define a channel having a height 120 and width 122 to enable the optical lens material to flow between each of the lens and spacer cavity portions. Flow stop control portions 102 may have a third top 118 and a third thickness 119. Third top 118 may be defined by the boundary of the mold 101 at the location of each respective flow stop control portion 106. Third thickness 119 may define height 120. Flow stop control portions 102 may be aligned with one or more of spacer cavity portion 104 and lens cavity portion 106 along a horizontal plane (i.e. defined by top of substrate 112, or a base layer on top of substrate 112).

Figure 2:
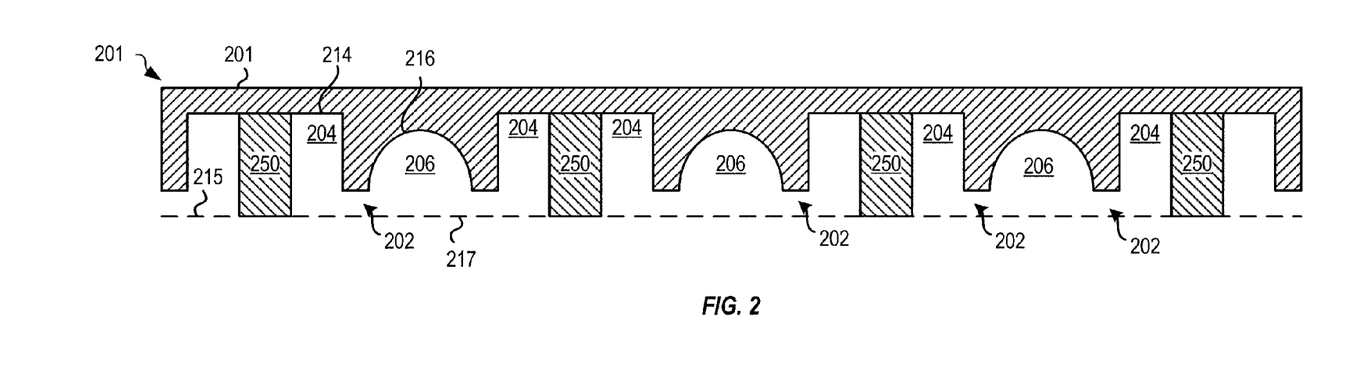
FIG. 2 depicts an exemplary mold apparatus including at least one pedestal for molding optical lenses during a puddle dispensing process, in one embodiment.

FIG. 2 depicts an exemplary mold 201 for molding optical lenses during a puddle dispensing process including at least one pedestal 250, in one embodiment. Mold 201 is similar to mold 101 in that it includes at least one spacer cavity portion 204, at least one lens cavity portion 206, and at least one flow stop control portion 202. For clarity of illustration, not all spacer cavity, lens cavity and flow stop control portions are labeled in FIG. 2. Mold 201 further includes at least one pedestal 250 located within respective spacer cavity portion 204.

Pedestal 250 spans, for example, from a first top 214 an entire first thickness 215. First top 214 and first thickness 215 are similar to first top 114 and first thickness 115 in that they define a height of spacer cavity portion 204 and 104, respectively. Accordingly, in one embodiment, spacer cavity portion 204 and pedestal 250 are of the same height. In an embodiment, the height of pedestal 250 is taller than the lens center thickness For example; the lens center thickness may be defined by the maximum distance between second top 216 and the edge of the optical lens material (e.g. the maximum thickness of an optical lens formed using mold 201).

Within FIG. 2, pedestal 250 and mold 201 are illustrated having different illustrative fill patterns (i.e. pedestal 250 has a top left to bottom right diagonal fill and mold 201 is illustrated with a bottom left to top right diagonal fill). Accordingly, in one embodiment, pedestal 250 and mold 201 are made of different materials. However, in an alternate embodiment, pedestal 250 and mold 201 are made of the same material. Pedestal 250 and mold 201 may be made from one continuous piece of materials, or from separate materials which are coupled together.

Pedestals 250 enable a spacer and lens to be replicated at the same time without air bubbles trapping within the lens or spacer cavity portions using a single optical lens material via the puddle dispensing process method, i.e. within spacer cavity portion 204 and lens cavity portion 206, respectively. Accordingly, each spacer formed within spacer cavity portion 204 may act as an optical material flow channel between each lens cavity portion 206.

Figure 3:
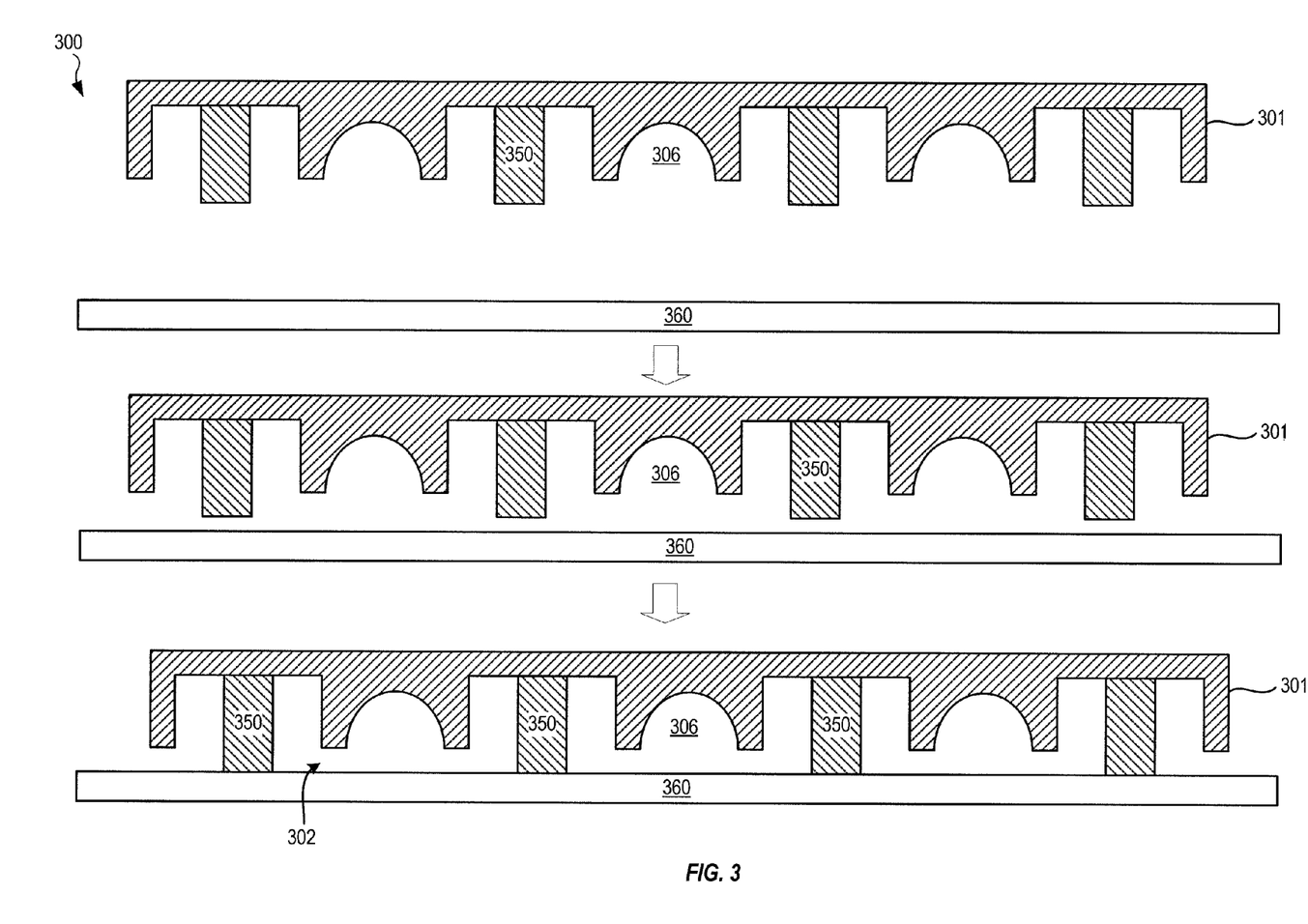
FIG. 3 depicts an exemplary diagram of a mold apparatus being imprinted upon a substrate, in one embodiment.

FIG. 3 depicts an exemplary diagram 300 of a mold apparatus 301 being imprinted upon a substrate 360. For clarity of illustration, not all elements are labeled within FIG. 3. Mold apparatus 301 may be any one of mold apparatus 100 and/or 200 and may include spacer cavity portions 104, 204, lens cavity portions 106, 206, flow stop control portions 102, 202 and pedestals 250. Mold apparatus 301 is imprinted upon substrate 360 by applying force to the top of mold apparatus 301. For clarity of illustration, optical lens material is not included in FIG. 3. Accordingly, when there is no optical lens material present, pedestals 350 (similar to pedestals 250) are in direct contact with substrate 360. However, no portion of mold apparatus 301 associated with lens cavity portion 306 (similar to lens cavity portions 106, 206) is in contact with substrate 360.

As illustrated in FIG. 3, pedestals 350 provide mold support when mold apparatus 301 is in contact with the substrate so that optical lens material can flow into lens and spacer cavity throughout the mold apparatus 301 during the imprinting process. Pedestal 350 prevents substrate 360 from being in direct contact with the edge of mold apparatus 301, particularly where lens cavity portion 306 is located. Accordingly, risk of damaging the lens clear aperture and the lens maximum aperture of a lens formed using mold apparatus 301 is minimized. Furthermore, flow control portion 302 minimizes the air bubbles trapped within spacer cavity portions and lens cavity portions, as discussed above.

Figure 4:
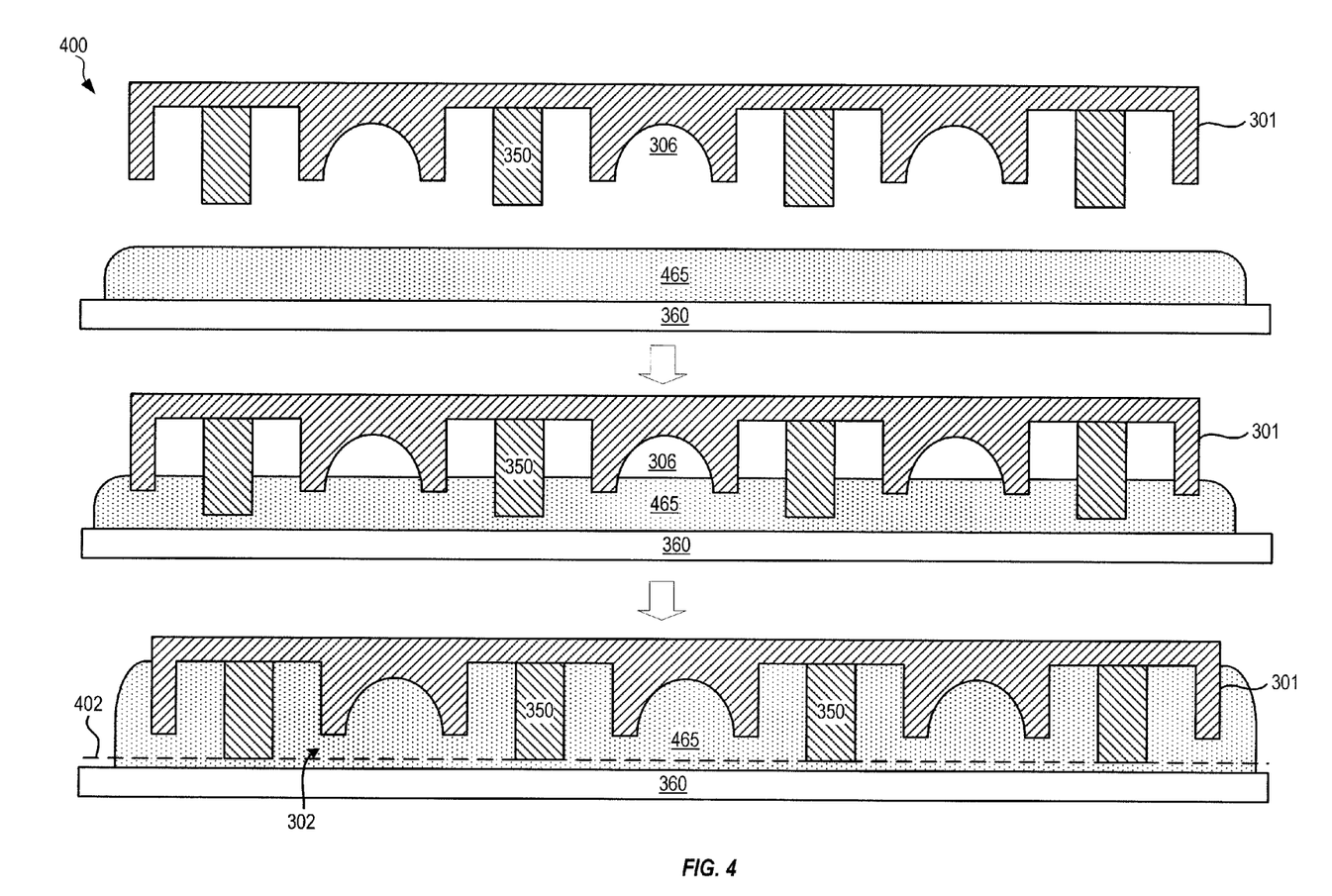
FIG. 4 depicts an exemplary diagram of the mold apparatus, of FIG. 3, being imprinted on a substrate including optical lens material.

FIG. 4 depicts an exemplary diagram 400 of mold apparatus 301, of FIG. 3, being imprinted on a substrate 360 including optical lens material 465, in one embodiment. As illustrated in FIG. 4, optical lens material 465 flows between spacer cavity portions 304 and lens cavity portions 306 via flow stop control portions 302 such that air bubbles are minimized within spacer and lens cavity portions 304 and 306, respectively.

As illustrated, when optical lens material 465 is present during the imprinting process, a thin layer 402 of optical lens material 465 is formed under pedestals 350. Thin layer 402 of optical lens material 465 is a base layer formed upon substrate 360. This significantly reduces the material used during the puddle dispensing process because a specific base layer does not need to be formed during the puddle dispensing imprinting process. For example, thin layer 402 may be less than ten micrometers. Thin layer 402 provides for less stress after curing of optical lens material 465 due to the thickness of the layer.

Figure 5:
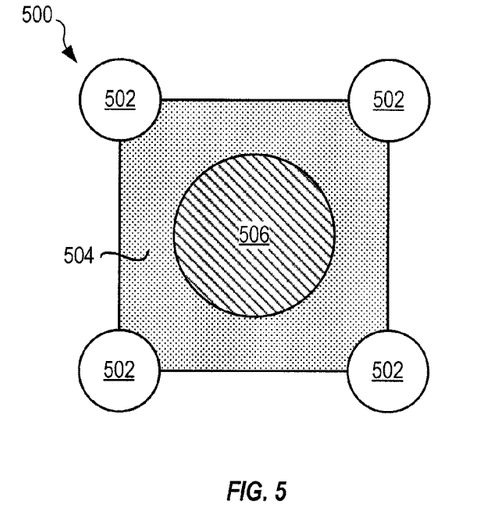
FIG. 5 depicts a top view of a two by two lens array formed using a mold apparatus having a single cylindrical pedestal, in one embodiment.

FIG. 5 depicts a top view of a two by two lens array 500 formed using a mold apparatus having a single cylindrical pedestal, in one embodiment. Lens array 500 includes four lenses 502 separated by spacer 504. Within spacer 504 is a cavity 506 formed around a single cylindrical pedestal.

Figure 6:
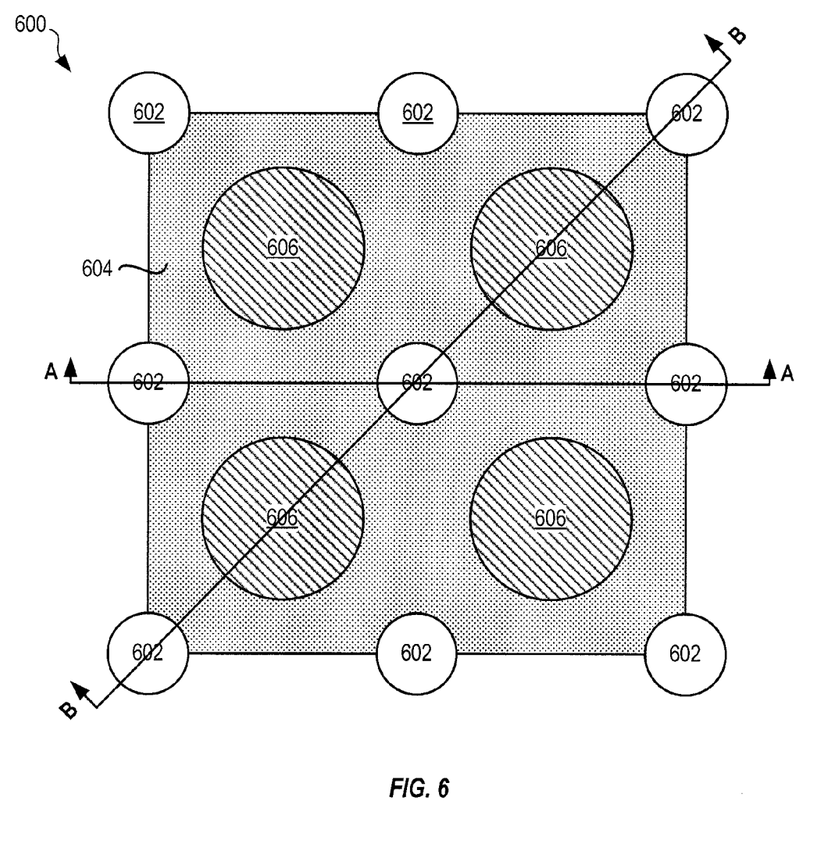
FIG. 6 depicts a top view of a three by three lens array formed using a mold apparatus having a single cylindrical pedestal, in one embodiment.

FIG. 6 depicts a top view of a three by three lens array 600 formed using a mold apparatus having a single cylindrical pedestal, in one embodiment. Lens array 600 is similar to lens array 500, however the mold apparatus is expanded such that there are multiple lens cavity portions, spacer cavity portions, flow stop control portions, and pedestals. As illustrated in FIG. 6, there are nine lenses 602 formed and separated from each other by spacer 604. A cavity 606 is formed between any four lenses 602. Cavity 606 is located within spacer 604 and is formed around a single cylindrical pedestal.

Figure 7:
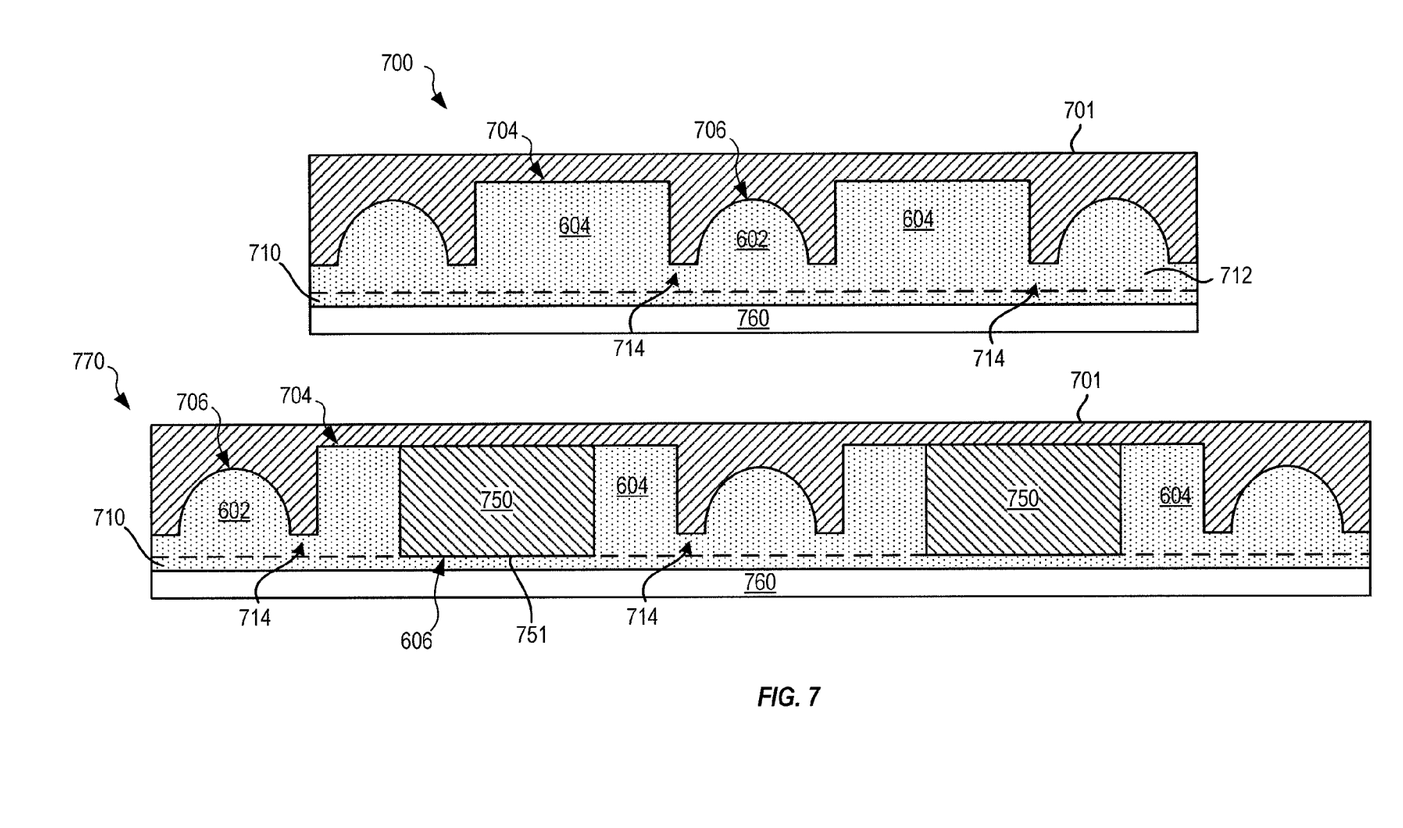
FIG. 7 depicts two exemplary cross-sectional views along cross section lines A-A and B-B of the lens array of FIG. 6, including a mold apparatus.

FIG. 7 depicts two exemplary cross-sectional views 700 and 770 along cross section lines A-A and B-B of lens array 600, of FIG. 6, including mold apparatus 701.

As shown by cross-sectional view 700, which corresponds to cross section line A-A, spacer 604 is formed within spacer cavity portions 704 of mold apparatus 701. Further, lenses 602 are formed within lens cavity portions 706. As illustrated by cross-sectional view 700, optical lens material 712 may freely flow between spacer cavity portion 704 and lens cavity portion 706 through flow stop control portion 714, thereby minimizing air bubbles formed within spacer 604 and/or lens 602. Further, a thin base layer of optical material 710 may be formed on top of the entire top surface of substrate 760. In one embodiment, thin base layer is less than 10 micrometers thick.

As shown by cross-sectional view 770, which corresponds to cross section line B-B, each pedestal 750 forms cavity 606 within spacer 604. Spacer 604 is for example a single, continuous portion of optical lens material throughout lens array 600 that is formed during the imprinting process.

Figure 8:
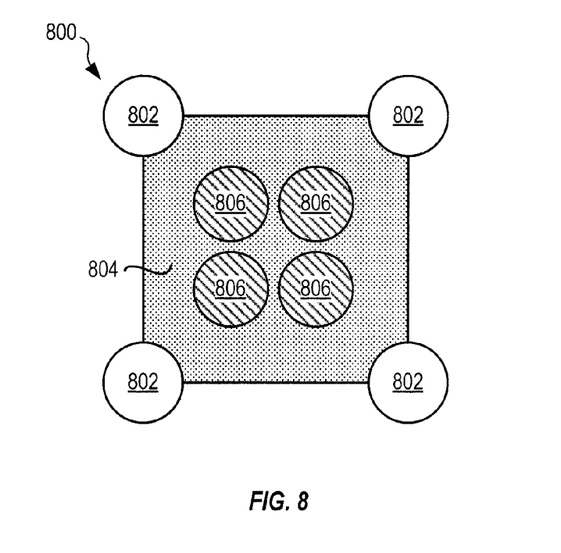
FIG. 8 depicts a top view of a two by two lens array formed using a mold apparatus having a plurality of cylindrical pedestals, in one embodiment.

FIG. 8 depicts a top view of a two by two lens array 800 formed using a mold apparatus having a plurality of cylindrical pedestals, in one embodiment. Lens array 800 includes four lenses 802 separated by spacer 804. Within spacer 804 are cavities 806 formed around a plurality of cylindrical pedestals of a mold apparatus. FIG. 8 is illustrated having four cavities 806 between any four lenses 802, however it will be appreciated that there may be more or fewer cavities 806 without departing from the scope hereof.

Figure 9:
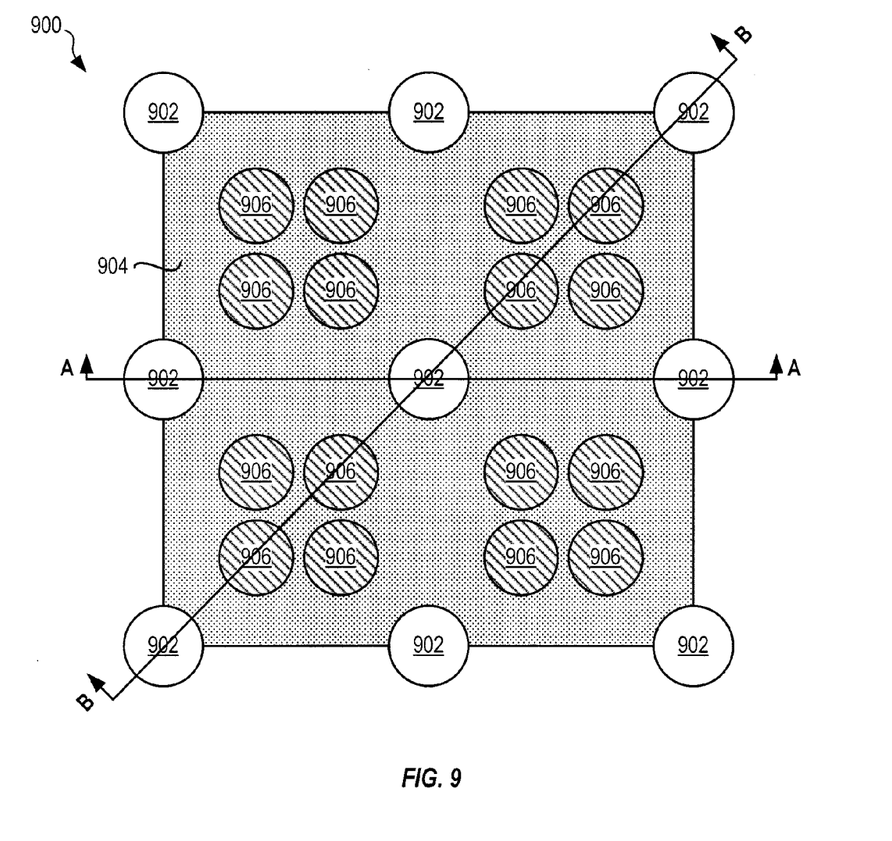
FIG. 9 depicts a top view of a three by three lens array formed using a mold apparatus having a plurality of cylindrical pedestals, in one embodiment.

FIG. 9 depicts a top view of a three by three lens array 900 formed using a mold apparatus having a plurality of cylindrical pedestals, in one embodiment. Lens array 900 is similar to lens array 800, however the mold apparatus is expanded such that there are multiple lens cavity portions, spacer cavity portions, flow stop control portions, and pedestals. As illustrated in FIG. 9, there are nine lenses 902 formed each separated by spacer 904. A cavity 906 is formed between any four lenses 902. Cavity 906 is located within spacer 904 and is formed around a plurality of cylindrical pedestals.

Figure 10:
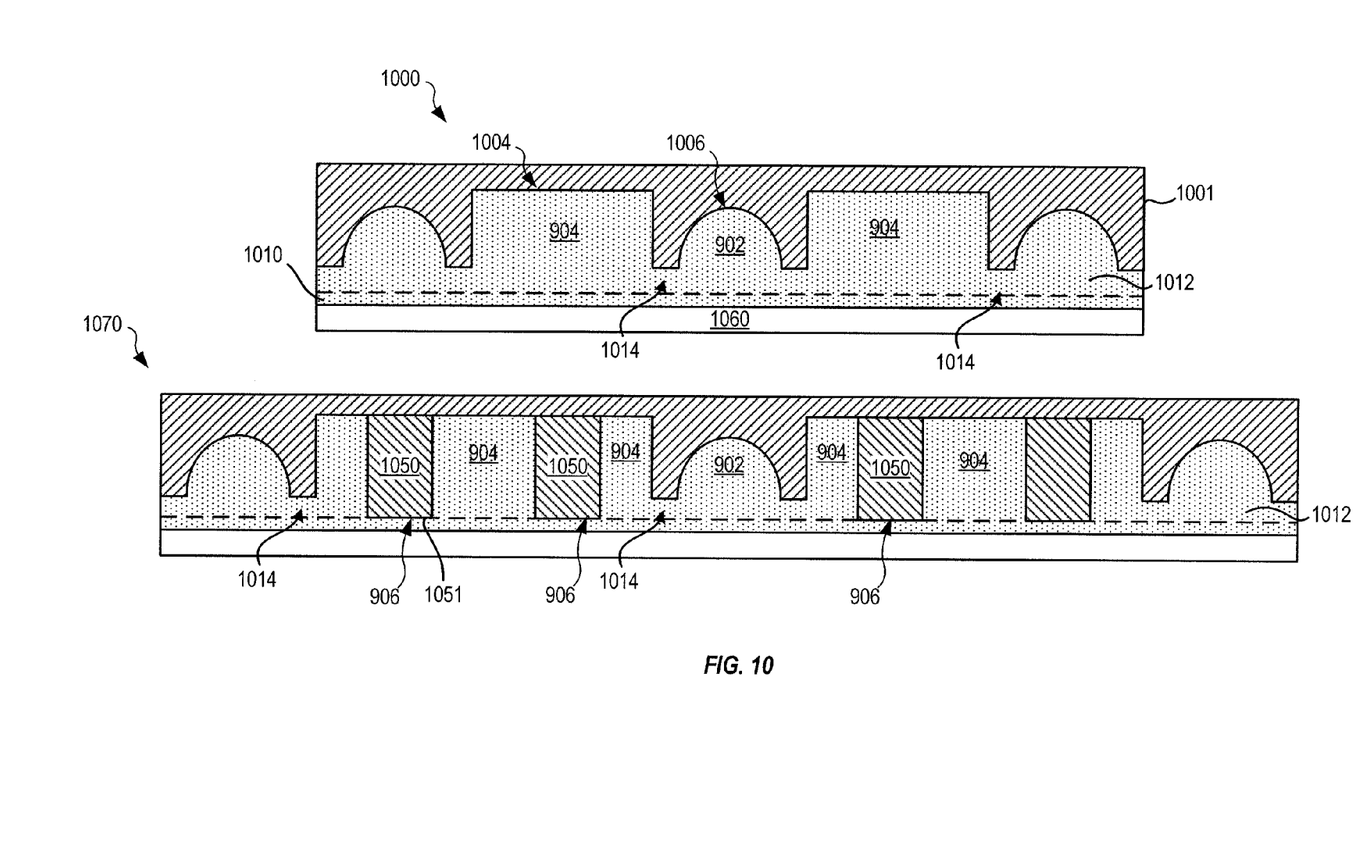
FIG. 10 depicts two exemplary cross-sectional views along cross sectional lines A-A and B-B, respectively, of the lens array of FIG. 9 including a mold apparatus.

FIG. 10 depicts two exemplary cross-sectional views 1000 and 1070 along cross sectional lines A-A and B-B, respectively, of the lens array 900, of FIG. 9, including mold apparatus 1001.

As shown by cross-sectional view 1000, spacer 904 is formed within spacer cavity portions 1004 of mold apparatus 1001. Further, lenses 902 are formed within lens cavity portions 1006.

As illustrated by cross-sectional views 1000 and 1070, optical lens material 1012 may freely flow between spacer cavity portion 1004 and lens cavity portion 1006 through flow stop control portion 1014, thereby minimizing air bubbles formed within spacer 904 and/or lens 902. A thin base layer of optical material 1010 is formed a top the entire top surface of substrate 1060.

As shown by cross-sectional view 1070, each pedestal 1050 forms cavity 906 within spacer 904. Spacer 904 is for example a single, continuous portion of optical lens material throughout lens array 900 that is formed during the imprinting process.

Figure 11:
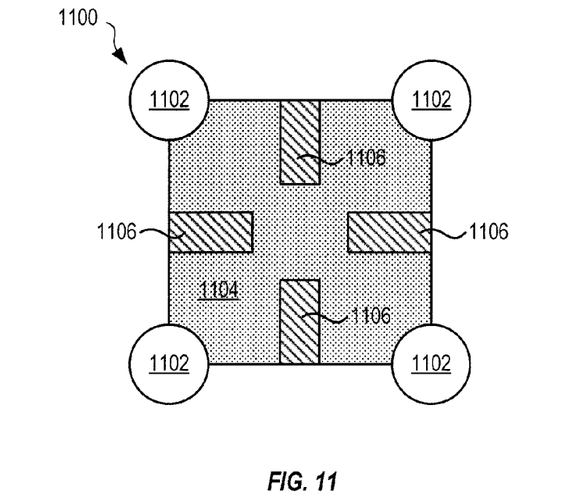
FIG. 11 depicts a top view of a two by two lens array formed using a mold apparatus having a plurality of bar pedestals, in one embodiment.

FIG. 11 depicts a top view of a two by two lens array 1100 formed using a mold apparatus having a plurality of bar pedestals, in one embodiment. Lens array 1100 includes four lenses 1102 separated by spacer 1104. Within spacer 1104 are cavities 1106 formed around a plurality of bar pedestals of a mold apparatus. FIG. 11 is illustrated having a single bar-shaped cavity 1106 between any two of lenses 1102, however it will be appreciated that there may be more or fewer cavities 1106 without departing from the scope hereof.

Figure 12:
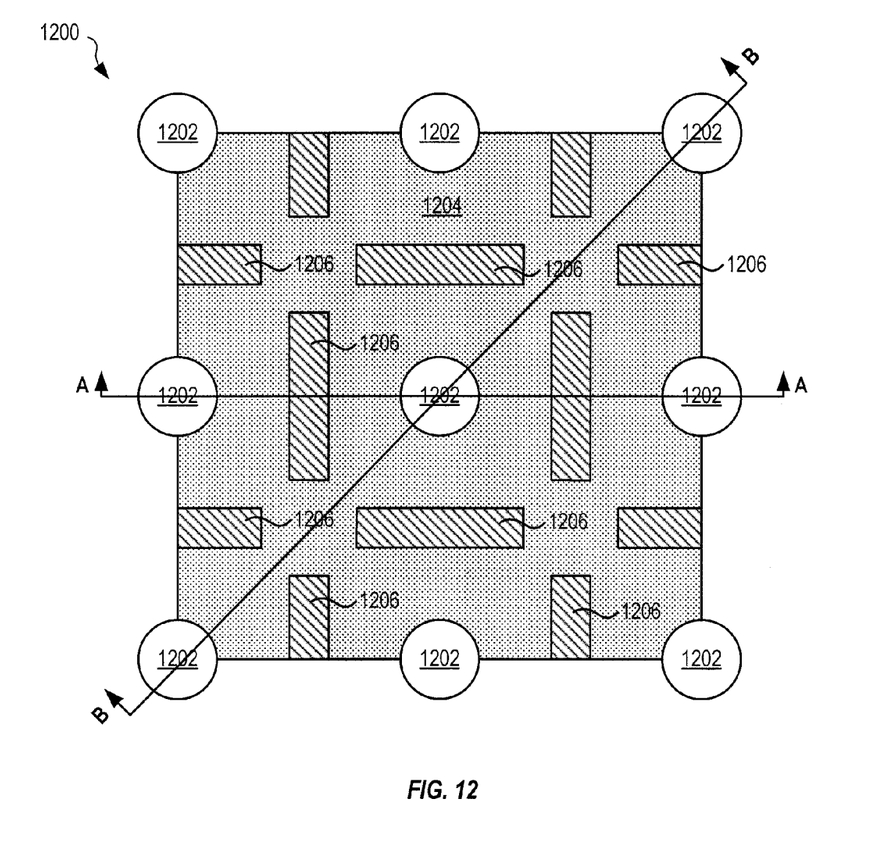
FIG. 12 depicts a top view of a three by three lens array formed using a mold apparatus having a plurality of bar pedestals, in one embodiment.
Figure 13:
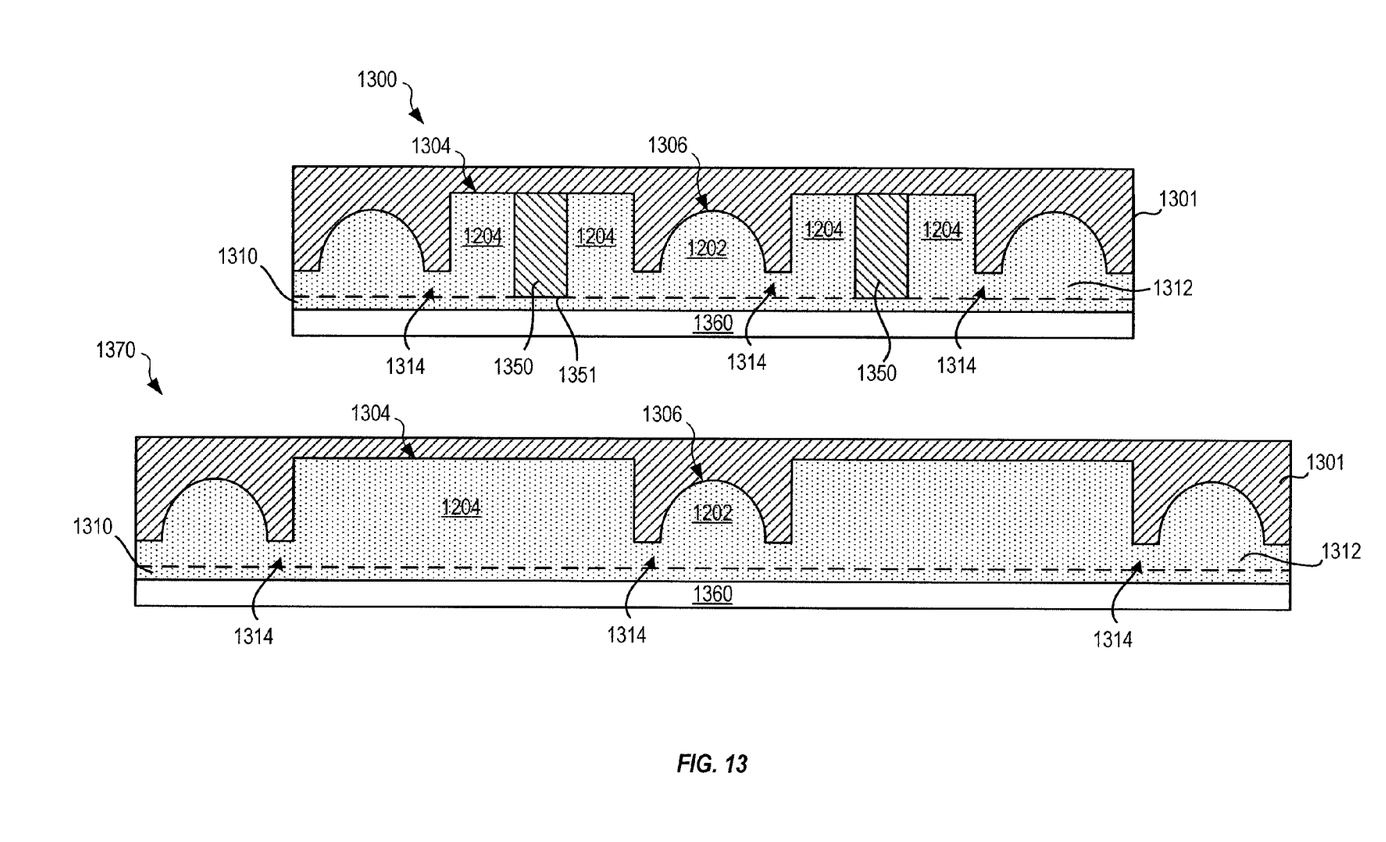
FIG. 13 depicts two exemplary cross-sectional views along cross sectional lines A-A and B-B, respectively, of the lens array of FIG. 12 including a mold apparatus.

FIG. 12 depicts a top view of a three by three lens array 1200 formed using a mold apparatus having a plurality of bar pedestals, in one embodiment. Lens array 1200 is similar to lens array 1100, however the mold apparatus is expanded such that there are multiple lens cavity portions, spacer cavity portions, flow stop control portions, and pedestals. As illustrated in FIG. 12, there are nine lenses 1202 formed each separated by spacer 1204. A cavity 1206 is formed between any two adjacent lenses 1202. Cavity 1206 is located within spacer 1204 and is formed around a bar-shaped pedestal. FIG. 13 depicts two exemplary cross-sectional views 1300 and 1370 along cross sectional lines A-A and B-B, respectively, of lens array 1200, of FIG. 12, including mold apparatus 1301.

As shown by cross-sectional view 1300, spacer 1204 is formed within spacer cavity portions 1004 of mold apparatus 1001. Further, lenses 1202 are formed within lens cavity portions 1306.

As illustrated by cross-sectional views 1300 and 1370, optical lens material 1312 may freely flow between spacer cavity portion 1304 and lens cavity portion 1306 through flow stop control portion 1314, thereby minimizing air bubbles formed within spacer 1204 and/or lens 1202. Further, a thin base layer of optical material 1310 may be formed a top the entire surface of substrate 1360. Pedestals 1350 form cavities 1306 within spacer 1204. Spacer 1204 is for example a single, continuous portion of optical lens material throughout lens array 1200 that is formed during the imprinting process.

As shown by cross-sectional view 1370, pedestals 1230 are not present between two diagonal lenses 1202. It will be appreciated that any additional form of pedestal shapes, sizes, or characterizations may be used without departing from the scope hereof.

The embodiments described above discuss cylindrical and bar shaped pedestals, however it is appreciated that alternate shapes may be used without departing from the scope hereof. Cylindrical shaped pedestals (i.e. those described with respect to FIGS. 8-10) do not provide sharp corners and therefore reduce the stress built up throughout the optical lens array proximate the pedestals. Accordingly, it is appreciated that the bar shaped pedestals (i.e. pedestals described with respect to FIGS. 11-13) may have rounded corners thereby reducing stress on the optical array after curing.

Figure 14:
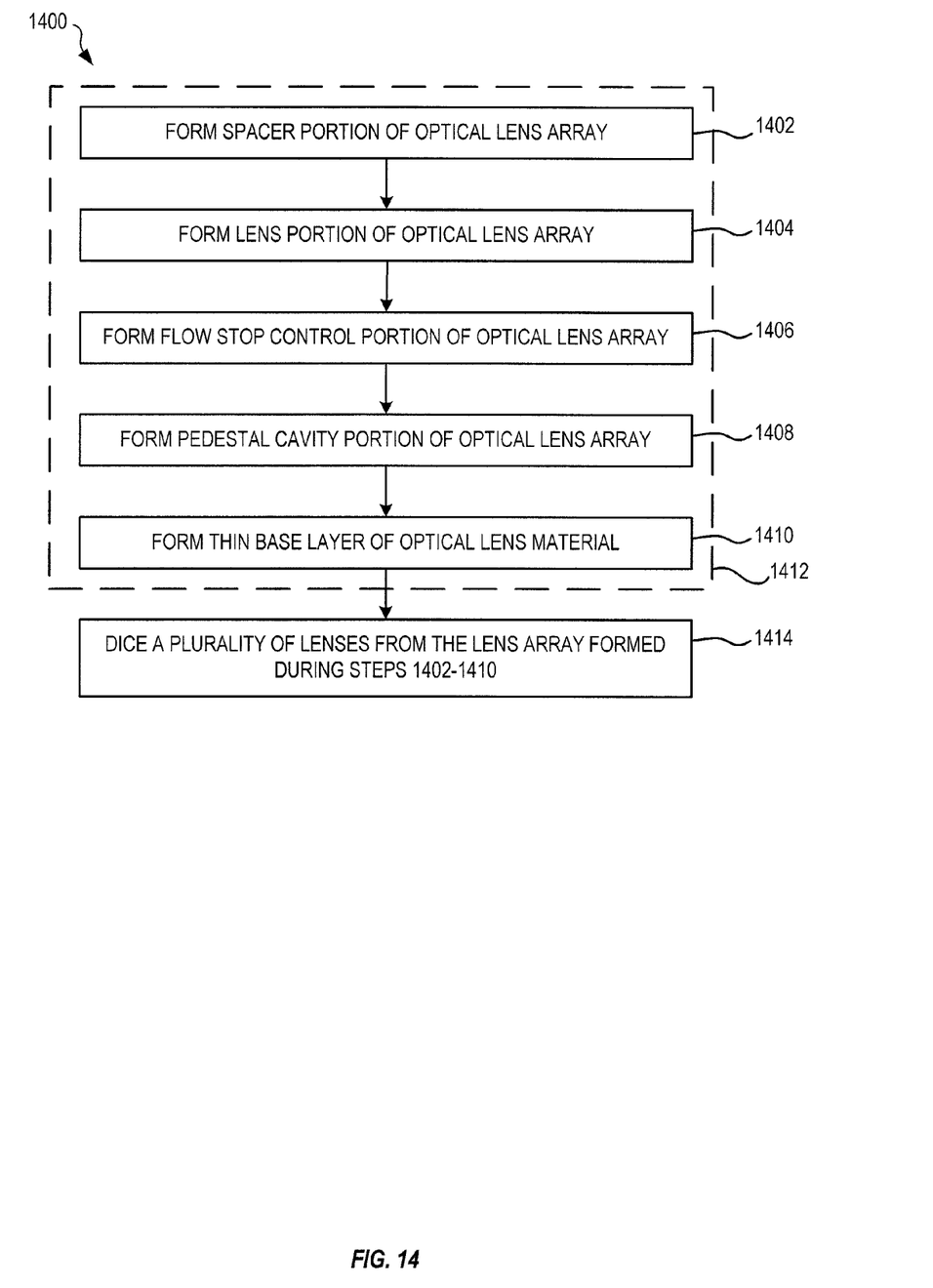
FIG. 14 is a flow chart depicting an exemplary method for manufacturing an optical lens array, in one embodiment.

FIG. 14 is a flow chart depicting an exemplary method 1400 for manufacturing an optical lens array, in one embodiment. Method 1400 is for example performed by imprinting one of the mold apparatuses described above onto a substrate.

In step 1402, method 1400 forms a spacer portion of the optical lens array. For example, a spacer (e.g. one or more of spacer 504, 604, 804, 904, 1104, and/or 1204) is formed of optical lens material by imprinting an optical mold having a spacer cavity portion (as described above) onto a substrate.

In step 1404, method 1400 forms a lens portion of the optical lens array. For example, a lens (e.g. one or more of lens 502, 602, 802, 902, 1102, and/or 1202) is formed of optical lens material by imprinting an optical mold having a lens cavity portion (as described above) onto a substrate.

In step 1406, method 1400 forms a flow stop control portion of the optical lens array. For example, a flow stop control portion (e.g. one or more of flow stop control portions 714, 1014, and 1314) is formed during imprinting of an optical mold apparatus having a spacer cavity portion, lens cavity portion and flow stop control portion by optical lens material flowing between the spacer cavity portion and the lens cavity.

In step 1408, method 1400 forms a pedestal cavity portion of the optical lens array. For example, a pedestal cavity portion (e.g. one or more of pedestal cavities 506, 606, 806, 906, 1106, and/or 1206) is formed of optical lens material by imprinting an optical mold having a pedestal portion (as described above) onto a substrate.

In step 1410, method 1400 forms a thin base layer of optical material of the optical lens array. For example, a thin base layer (e.g. one or more of base layers 710, 1010, and 1310) is formed of optical lens material between the mold apparatus and the substrate (e.g. from the top of the substrate to the top of pedestal cavity 751, 1051, and/or 1351). Accordingly, in one embodiment the thin base layer has a thickness that is equivalent to the amount of optical lens material between a substrate and the pedestal cavity. In one embodiment, the thin base layer is less than 10 micrometers.

As indicated by dashed line 1412, one or more of steps 1402-1410 may be completed concurrently during the imprinting process. For example, a single mold apparatus may have one or more of a spacer cavity portion, a lens cavity portion, a flow stops control portion, and a pedestal, as discussed above. The single mold apparatus may then be imprinted onto a substrate such that a spacer, lens, flow stop control, pedestal cavity and thin base layer are all formed concurrently on top of the substrate.

In step 1414, method 1400 dices the optical lens array to form a plurality of optical lenses. For example, one or more of lens arrays 600, 900, and/or 1200 may be diced along dashed line 608, 908, and 1208, respectively, to form a plurality of optical lenses. By having a thin base layer, the lens array is significantly less vulnerable to damage during the dicing process.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An optical lens mold for use during a wafer level puddle dispensing process, comprising: a spacer cavity portion with a first top; a lens cavity portion with a second top; and, a flow stop control portion, with a third top, defining a channel located between the spacer cavity portion and the lens cavity portion; wherein the spacer cavity portion, the lens cavity portion and the flow stop control portion are aligned along a first horizontal plane such that optical lens material flow between the lens cavity portion and spacer cavity portion through the flow stop control portion.

2. The optical lens mold of claim 1, the spacer cavity portion, the lens cavity portion, and the flow stop control portion respectively comprising a plurality of spacer cavity portions, a plurality of lens cavity portions and a plurality of flow stop control portions collectively forming an optical mold array for concurrently molding multiple optical lenses.

3. The optical lens mold of claim 1, further comprising a pedestal, within the spacer cavity portion, spanning from the first top along a first thickness of the spacer cavity portion.

4. The optical lens mold of claim 3, the pedestal comprising a single circular pedestal.

5. The optical lens mold of claim 4,
the spacer cavity portion, the lens cavity portion, the flow stop control portion, and the singular circular pedestal respectively comprising a plurality of spacer cavity portions, a plurality of lens cavity portions, a plurality of flow stop control portions, and a plurality of single circular pedestals forming an optical mold array for concurrently molding multiple optical lenses;
wherein one of the plurality of single circular pedestals is located between four of the lens cavity portions.

6. The optical lens mold of claim 3, the pedestal comprising a group of multiple circular pedestals.

7. The optical lens mold of claim 6,
the spacer cavity portion, the lens cavity portion, the flow stop control portion, and the group of multiple circular pedestals respectively comprising a plurality of spacer cavity portions, a plurality of lens cavity portions, a plurality of flow stop control portions, and a plurality of groups of multiple circular pedestals forming an optical mold array for concurrently molding multiple optical lenses;
wherein one of the plurality of groups of multiple circular pedestals is located between four of the lens cavity portions.

8. The optical lens mold of claim 3, the pedestal comprising a rectangular bar pedestal.

9. The optical lens mold of claim 8,
the spacer cavity portion, the lens cavity portion, the flow stop control portion, and the rectangular bar pedestal respectively comprising a plurality of spacer cavity portions, a plurality of lens cavity portions, a plurality of flow stop control portions, and a plurality of rectangle bar pedestals forming an optical mold array for concurrently molding multiple optical lenses;
wherein one of the plurality of rectangle bar pedestals is located between two of the lens cavity portions.

10. A method of manufacturing an optical lens array comprising: imprinting an optical lens mold on a substrate having optical material disposed thereon to concurrently form a spacer portion of the optical lens array; lens portion of the optical lens array; flow stop control portion of the optical lens array, the flow stop control portion defining a cavity between the lens portion and spacer portion; wherein the optical lens material flows between the spacer portion and the lens portion through the flow stop control portion during the step of imprinting the optical lens mold.

11. The method of claim 10, the step of imprinting further concurrently forming a pedestal cavity portion within the spacer portion.

12. The method of claim 11, the pedestal cavity portion being a single cylindrical pedestal cavity shape located between any four adjacent lens portions.

13. The method of claim 11, the pedestal cavity portion being a plurality of cylindrical pedestal cavity portions located between any four adjacent lens portions.

14. The method of claim 11, the pedestal cavity portion being a bar-shaped pedestal cavity portion located between any two adjacent lens portions.

15. The method of claim 11, further comprising forming a base layer of the optical lens material between the substrate and a top of the pedestal cavity portion.

16. The method of claim 15, the base layer being less than ten micrometers.

17. An optical lens array, the optical lens array comprising: plurality of optical lens portions spacer portion; and flow stop control portion located between the spacer portion and the plurality of optical lens portions; wherein the flow stop control portion, the spacer portion, and the plurality of optical lens portions are made of a single optical lens material the spacer portion having a first height that is taller than a second height of the plurality of optical lens portions.

18. The optical lens array of claim 17, the optical lens array further including a pedestal cavity portion.

19. The optical lens array of claim 18, the pedestal cavity portion being a single cylindrical pedestal cavity located between four adjacent optical lens portions of the plurality of optical lens portions.

20. The optical lens array of claim 18, the pedestal cavity portion being a plurality of cylindrical pedestal cavities located between four adjacent optical lens portions of the plurality of optical lens portions.

21. The optical lens array of claim 18, the pedestal cavity portion being a bar-shaped pedestal cavity located between two adjacent optical lens portions of the plurality of optical lens portions.

22. The optical lens array of claim 18 further including a substrate having a base layer of optical lens material thereon.

23. The optical lens array of claim 22, the base layer being less than ten micrometers thick.

24. The optical lens array of claim 22, the base layer being the thickness of an amount of optical lens material disposed between the substrate and pedestal cavity portion.

* * * * *